3,428,274
AIRCRAFT TOUCHDOWN WHEEL SYNCHRONIZER
Wally Ellis, 1422 SE. Henry St. 97202, and Elmer W. Arthur, 6415 NE. 34th Ave. 97211, both of Portland, Oreg.
Filed Sept. 19, 1966, Ser. No. 580,449
U.S. Cl. 244—103         1 Claim
Int. Cl. B64c 25/40

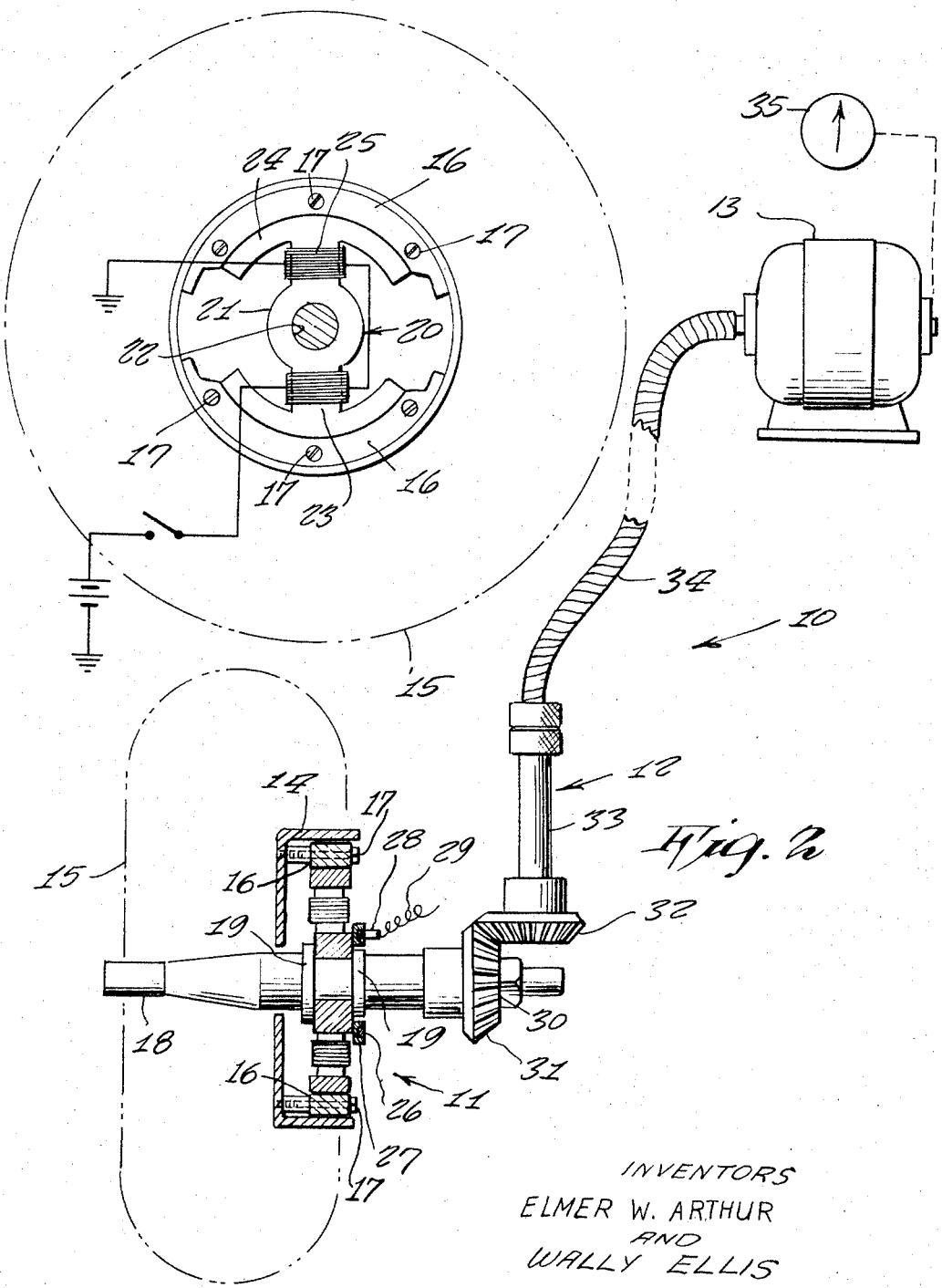

ABSTRACT OF THE DISCLOSURE

A device for synchronizing the circumferential speed of airplane wheels, prior to landing, with the speed of the airplane above the ground, thereby preventing stress on the wheel structure and possible tire blowout, the device comprising a tachometer coupled with a rotating electromagnet which influences a pair of poleshoes on the wheel drum.

---

This invention relates generally to aircraft landing wheels. More specifically it relates to means for rotating airplane wheels prior to landing.

It is generally well known to those skilled in the art that when an airplane comes in for a landing that the wheels thereof should preferably be in a rotating condition so as to lessen the stress thereupon at the moment that the wheels touch the ground. Without such preliminary rotation, there would be a greater possibility of nosing over of the craft, a blow-out of the wheel tire, or other severe stress upon the wheel structure. Various mechanisms have been developed in the past to attain rotating of the wheels prior to the aircraft's landing, however it is believed that previous structures do not have the refinement of operation of the present invention.

Accordingly, it is a principal object of the present invention to provide a mechanism whereby the aircraft wheels may be made to rotate at a speed which is equal to the speed of the craft at the moment that it touches the ground.

Another object of the present invention is to provide an aircraft touchdown wheel synchronizer wherein the speed of the wheel is governed by use of a tachometer.

Yet another object of the present invention is to provide an aircraft touchdown wheel synchronizer wherein the wheel rotation is powered by an electrical motor.

Yet another object of the present invention is to provide an aircraft touchdown wheel synchronizer wherein a rotating electromagnet provides magnetic influence upon a pair of poleshoes within the drum or brakedrum of an aircraft wheel and influence the same to rotate at the speed of rotation of the electromagnet.

Other objects of the present invention are to provide an aircraft touchdown wheel synchronizer which is simple in design, inexpensive to manufacture, rugged in construction, easy to use and efficient in operation.

These and other objects will be readily evident upon a study of the following specification and accompanying drawing wherein:

FIGURE 1 is a fragmentary side-elevation view of an aircraft wheel showing the relative position of a rotating electromagnet in relation to a pair of poleshoes secured within a brakedrum of the wheel and;

FIGURE 2 is a front elevation view of the present invention shown partly in cross-section.

Referring now to the drawing in detail the numeral 10 represents an aircraft touchdown wheel synchronizer according to the present invention wherein there is a wheel assembly 11, a drive mechanism 12 for transmitting power to the wheel assembly and a motor 13 for providing power to the drive mechanism.

The wheel assembly includes a brakedrum 14 secured within a wheel 15 of an airplance. Within the brakedrum there are a pair of poleshoes 16 located upon opposite sides diametrically and secured by means of screws 17 to the brakedrum. The wheel is mounted upon a spindle 18 extending centrally therewithin, the spindle being provided with a pair of spaced apart flanges 19 between which a rotatable electromagnet 20 is secured to the spindle. As shown in FIGURE 1 of the drawing, the electromagnet 20 includes a hub 21 having a central opening 22 for purpose of receiving a narrow diameter portion of the wheel spindle therethrough, and the hub having diametrically opposite radially outwardly extending arms 23, at the end of which there is an arcuate sector 24 which rotates within the space between the poleshoes. A coil winding 25 of electric wire is placed around each arm 23, the winding being connected electrically to a slip ring 26 secured within an insulation 27 the slip ring being engaged by a generator brush 28, connected by electrical wire 29 to a source of power for providing power to the electromagnet 20.

The drive mechanism 12 includes a beveled gear 30 mounted on one end of the wheel spindle shaft 31, the beveled gear 30 being engaged by a beveled gear 32 mounted on a transverse shaft 33 and the transverse shaft 33 being connected by a flexible shaft 34 to the motor 13.

In operative use the electromagnet is excited by a storage battery which creates a powerful electromagnetic force capable of turning any size of airplane wheel at any desired speed determined by a tachometer 35, so to synchronize the wheel circumferential speed with the landing speed of the airplane.

After the airplane has landed upon the runway of an airport, the airplane wheels are rotated by engagement with the ground surface and the electromagnet has no power whatsoever over the wheels.

I claim:

1. In an aircraft touchdown wheel synchronizer, the combination of a wheel assembly, a drive mechanism, a battery, and a motor, said drive mechanism transmitting power from said motor to said wheel assembly, said battery being electrically connected to an electromagnet of said wheel assembly for producing electromagnetism whereby the other portion of said wheel assembly will be attracted to the first said portion when said first portion is rotated, said wheel assembly including a brake drum on a wheel of an airplane, said brake drum having a pair of diametrically opposite poleshoes mounted within said brake drum, a wheel spindle centrally extending into said wheel, a pair of spaced apart flanges, a slip ring carried by said electromagnet, a brush in electrical contact with said slip ring, said generator being electrically connected to said battery, said electormagnet comprising a hub having a central opening receiving said wheel spindle therethrough, a pair of oppositely outwardly extending arms, an arcuate sector at the end of each said arm, said sector being rotatable within the space between said poleshoes and a coil winding on each of said arms electrically connected to said slip ring for transmitting electrical current from said battery to said electromagnetic members for producing electromagnetism within said electromagnet, said drive mechanism including a bevel gear at one end of said wheel spindle, said gear engaging a second bevel gear on the end of a transverse shaft rotatably driven by a flexible drive shaft connected therebetween and said motor, and said synchronizer including a tachometer in a circuit between said battery and said motor.

References Cited

UNITED STATES PATENTS

| 1,548,016 | 7/1925 | LaRiboisiere. | |
| 2,320,547 | 6/1943 | Tiger | 244—103 |
| 2,335,398 | 11/1943 | Downey | 244—103 XR |
| 2,338,699 | 1/1944 | Wilhoit et al. | 244—103 XR |
| 2,505,770 | 5/1950 | Hill | 244—103 |
| 2,764,721 | 9/1956 | Johnson | 310—78 XR |

FOREIGN PATENTS 618,838  4/1961  Canada.

MILTON BUCHLER, *Primary Examiner.*

P. E. SAUBERER, *Assistant Examiner.*